United States Patent [19]

Vingsbo

[11] Patent Number: 5,691,619
[45] Date of Patent: Nov. 25, 1997

US005691619A

[54] AUTOMATIC SAFETY SWITCH FOR PREVENTING ACCIDENTAL BATTERY DISCHARGE

[76] Inventor: Stefan G. Vingsbo, 1217 Post Oak Park, Houston, Tex. 77027

[21] Appl. No.: 331,704

[22] Filed: Oct. 31, 1994

[51] Int. Cl.$^6$ .............................. H01M 10/46; H02H 3/24
[52] U.S. Cl. ................................ 320/13; 361/92
[58] Field of Search ........................... 320/13; 361/92, 361/86

[56] References Cited

U.S. PATENT DOCUMENTS

| | | | |
|---|---|---|---|
| 3,395,288 | 7/1968 | Von Brimer. | |
| 3,474,296 | 10/1969 | Rickey. | |
| 4,088,940 | 5/1978 | Ciarniello et al.. | |
| 4,137,557 | 1/1979 | Ciarniello et al. | 361/92 |
| 4,218,717 | 8/1980 | Shuster | 361/79 |
| 4,493,001 | 1/1985 | Sheldrake | 391/92 |
| 4,864,154 | 9/1989 | Copeland et al.. | |
| 4,902,956 | 2/1990 | Sloan | 320/13 |
| 5,089,762 | 2/1992 | Sloan | 320/13 |
| 5,136,230 | 8/1992 | Gayler | 320/13 |
| 5,140,250 | 8/1992 | Morland | 320/13 |
| 5,159,257 | 10/1992 | Oka et al. | 320/13 |
| 5,200,877 | 4/1993 | Betton et al. | 361/92 |
| 5,321,389 | 6/1994 | Meister | 361/92 X |
| 5,332,958 | 7/1994 | Sloan | 320/13 |

Primary Examiner—Peter S. Wong
Assistant Examiner—Patrick B. Law

[57] ABSTRACT

An automatic safety switch provides an automotive battery with protection against accidental discharge due to operator neglect. Such operator neglect includes inadvertent use of electrical circuits such as headlights, parking lights, or interior lights subsequently to turning the ignition off. This invention is connected in series with at least one of the power cables connecting the battery to the fuse box of a vehicle. The choice of power cable is made based on where the circuits to be protected are connected inside the fuse box itself. The automatic safety switch is connected as close to the fuse box as possible, since all necessary connection points are available in the immediate vicinity of the fuse box. The automatic safety switch comprises circuitry that impedes a current flow to its protected output loads when the battery voltage has diminished to a minimum voltage that can safely start a vehicle. The automatic safety switch remains in its current impeded state until reset by the ignition switch. The ignition switch unconditionally resets the automatic safety switch. The automatic safety switch further comprises safety features that prevents it from turning off during reset, even if the battery voltage would diminish to an extremely low voltage. A timer further protects against battery discharge from small electrical loads such as the automatic safety switch itself.

1 Claim, 3 Drawing Sheets

AUTOMATIC SAFETY SWITCH FOR PREVENTING ACCIDENTAL BATTERY DISCHARGE

BACKGROUND OF THE INVENTION

1. Field of the Invention

The following invention is generally related to safety switch devices that connect between a battery and one or more loads (electricity users) for preventing accidental or excessive discharge. This invention is more particularly related to an automatic electric safety switch that prevents accidental or excessive battery discharges in automotive applications, beyond a level where the vehicle can be safely started. The invention protects against battery discharges that occur due to operator neglect.

2. Description of the Related Art

Automotive batteries that have been discharged beyond the point where the automobile can be started is an all too familiar problem. Most of these cases involve operator error. The driver left the interior, parking or the head lights on. Some cases involve auxiliary equipment powered from, for example, the cigarette lighter plug.

Many automobile manufacturers have focused on these common problems with accidental battery discharge, and have implemented wiring changes to try to prevent most of them. It is however, impossible to prevent all accidental discharges by wiring changes alone. For example, the cigarette lighter and the head lights can be wired into the ignition without much affecting the versatility of these accessories. The parking lights, on the contrary, cannot be wired into the ignition circuit; an operator must be able to leave his vehicle unattended with the parking lights on. Further, the interior lights would be rendered useless if they would not turn on when vehicle doors are opened. The cigarette lighter is often used to power accessories, such as portable computers and cellular equipment that continuously monitor incoming communications. The cigarette lighter is however wired into the ignition circuit by some automobile manufacturers.

Moreover, some loads are extremely unsuitable to disconnect from the battery. For example, the memory of engine management systems (varying degrees of microprocessor control of ignition, fuel injection, etc.) stores parameters that relate to driving habits etc. of the operator of that vehicle. These parameters are recorded over time and facilitate enhanced fuel economy, reduced pollution etc.. Repair shops take special precautions not to power down these circuits during repair. Most circuits of this type require a negligible mount of power and can therefore be disregarded as battery draining loads. Thus, it is necessary to give preferential treatment to various circuits in the electrical system of an automobile.

This, and related, problems have been recognized and various attempts with varying degrees of success have been made to solve them.

Wemhoner, Geman patent DE 3,742,312, describes a circuit in which a comparator actuates a relay subsequently to changing its state. The comparator is controlled by a voltage reference and by the voltage from the battery that the relay protects. The relay is actuated when the battery voltage diminishes and removes inessential loads from essential loads. The division of inessential and essential loads is also used in other prior art, but involves considerable wiring and is inconvenient for the after-market installation.

The Australian PCT application AU89/00249, and the U.S. Pat. Nos. 4,137,557 and 4,088,940 also distinguish between essential and nonessential loads in their respective wiring. The relay coil was driven by an amplifier. However, there are no reset features and the systems themselves are allowed to drain the battery even though non-essential loads are disconnected. These systems are also susceptible to prematurely reconnecting non-essential loads during the early battery recovery. None of the aforesaid specifications taught the use of an effective and economical device that provides for simple after-market installation with a minimum number of connections.

Sheldrake, U.S. Pat. No. 4,493,001, was essentially an original equipment device because of the large number of connections required in the automobile. Sheldrake essentially teaches as system incorporating two sets of delays. The first delay disregards temporary battery sags and the second delay eliminates sporadic transients emanating from door contacts etc.. Sheldrake also teaches the use of thresholds that are modified by a nominal current drain of various loads. The threshold sets the level of charge at which the battery is disconnected from one or more loads.

Shuster, U.S. Pat. No. 4,218,717, teaches the use of current threshold relays. His system monitors the current for excessive drain during excessive time periods. Triggering occurs subsequent to excessive current drain. It is not sensitive to small current drains that may be caused by, for example, the interior lights.

Betton et al., U.S. Pat. No. 5,200,877, teaches the use of a system that attaches directly to the poles of a battery. This system utilizes a motorized switch and isolates the entire electrical system, including the starter motor of the automobile, from the battery. This system utilizes two loads for the purpose of sensing a voltage drop across the second load subsequently to turning the ignition on. This voltage drop automatically resets the motorized switch and reconnects the electrical system to the battery. This system does not give any preferential treatment to any circuit in the electrical system, it has in fact no direct interaction at all with any of the circuits in the electrical system. This system does, however, provide for ease of installation but at the expense of versatility and cost.

Sloan, U.S. Pat. No. 4,902,956, teaches the use of battery discharge rate as an indicator of the battery state. Sloan also teaches the use manual override switches, and engine running indicator override for critical loads. His invention also utilizes a timer. The voltage threshold at which this device disconnects non-essential loads is modified by the rate of discharge from the battery.

Morland, U.S. Pat. No. 5,140,250 teaches the use of a charge indicator, i.e. sensing of current and elapsed time. This invention lets a user turn the system ON or OFF by temporarily changing a reference voltage in the circuit. The temporary change is performed manually. Morland's invention focuses on the use of solid state switching technology, i.e. transistors, as opposed to relays. He also teaches the use of a voltage multiplier to provide the necessary drive power for MOSFET transistors in a "high side switching configuration" where the source of the transistor is not referenced to ground.

Von Brimer, U.S. Pat. No. 3,395,288, teaches the use of zener diodes to modify the so called drop-out voltage of a relay, thereby turning it off. Zener diodes are unsuitable to most battery applications due to their high power consumption. Von Brimer also teaches the use of a manual reset switch that requires special user intervention.

Rickey, U.S. Pat. No. 3,474,296, teaches the use of a system similar to that of Von Brimer. He also uses a zener diode to modify the drop-out voltage of a relay. A manually operated switch also reset the relay.

Oka et al., U.S. Pat. No. 5,159,257, teaches the use of a system that protects a vehicular battery from being drained by auxiliary equipment. This system provides a limited use of the vehicular battery when the ignition is switched off, to prevent excessive discharge. This system is primarily based on a timer and a load current detector that determines the amount of charge used by the auxiliary equipment subsequently to turning the engine off, i.e. the current-time product.

Copeland et al., U.S. Pat. No. 4,864,154, is similar to Oka et al. in that he also makes use of a timer that is activated when the engine is turned off, but he does not account for the current consumed by the auxiliary equipment. Hence, Copeland does not limit the use of the vehicular battery based on charge consumed by the load. Limitation is based exclusively on the elapsed time from when the engine is turned off.

Finally, Gayler, U.S. Pat. No. 5,136,230, teaches the use of a system that utilizes multiple manual override circuits. His systems reduces the relay coil current subsequently to activating the relay, in order to reduce the power consumption of the protective circuit itself. He also teaches a fail safe mode and the use of time delays to minimize false triggering. However, Gayler does not teach any differentiation among the various circuits in the electrical system. Gayler also teaches the use of alternator and various other connections that are regarded as redundant or unnecessary by applicant.

The present invention is directed to overcoming one or more of the problems set forth above.

SUMMARY OF THE INVENTION

One object of this invention is to provide a battery safety switch which prevents inadvertent battery drainage of a vehicular battery, thus extending the expected battery life.

Another object of the present invention is to provide a battery safety switch that exhibits a threshold level for cut-off that ensures that the vehicle can safely be started subsequent to cut-off.

Another object of the present invention is to provide a battery safety switch that exhibits a second threshold level for cut-off that ensures that the relay itself does not discharge the battery beyond a safe charge level.

Another object of the present invention is to provide a timer that intermittently activates the second threshold after a preset time interval.

Another object of the present invention is to provide a battery safety switch that is easily installable as an after-market device.

Another object of the present invention is to provide a battery safety switch that presents the vehicle operator with transparent functionality.

Another object of the present invention is to provide a fail-safe operating mode where the cut-off level of the relay is substantially independent of the battery voltage during reset.

Another object of the present invention is to provide a fail-safe operating mode where the cut-off level of the relay is substantially independent of the battery voltage.

Another object of the present invention is to provide redundant circuitry where alternate current paths provide the relay coil with current in the event of circuit failure.

Another object of the present invention is to provide a battery safety switch that, subsequently to cut-off, returns to its conducting state only when reset by the ignition switch.

In one embodiment of the present invention a battery safety switch is provided that continuously monitors the battery voltage and compares it to a voltage reference. A relay is disengaged subsequently to detecting a battery voltage that is of lower magnitude than the reference. The relay maintains its disengaged state until a reset signal is generated. The reset signal is generated by the ignition switch, and is unconditional, i.e. the ignition switch energizes the relay regardless of any other condition or event. The ignition switch also maintains the reset condition so long it is turned on. It is thus not possible for the relay to disengage any electrical equipment in a vehicle while the vehicle is being driven. The relay remains engaged subsequently to turning the ignition switch off only when the battery voltage is above the predetermined first reference level. This would normally occur since the battery is recharged when driving the car. However, it is possible to deliberately drain the battery beyond a point where the battery can safely start the car. For instance, it may be more desirable to keep hazard lights on rather than saving the battery.

A timer is also reset when the ignition is turned off. The timer controls a second threshold by modifying the voltage reference. Each time the timer reaches the preset time limit the voltage reference is momentarily increased from the first to the second voltage level. The timer is subsequently reset. Hence, the timer provides brief time periods during which it is possible to determine if the internal power consumption of the battery safety switch itself is draining the battery beyond a safe charge level. The relay is disengaged if this is the case. The second threshold also serves to protect against other minor loads, such as accessories attached to the cigarette lighter. This second threshold is necessary since batteries do not recover as much when disconnected from low loads as when disconnected from high loads.

The circuits connected to the present invention include all circuits that meet two conditions: 1) battery drainage is independent of the ignition switch in the vehicle and 2) the particular circuit is engaged manually by the operator of the vehicle. The most common circuits meeting these criteria comprise Headlights, parking lights, interior lights, and accessories connected to the cigarette lighter with an adaptor. Some vehicle makes have the headlights connected to the ignition circuit, and are thereby protected from operator neglect as far as headlights are concerned. Other car makes have the cigarette lighter wired to the ignition. However, parking lights and interior lights cannot provide adequate functionality and battery protection simultaneously. Parking lights require full functionality while the vehicle is left unattended with the ignition switched off. Nobody would be particularly keen on exposing their vehicle to the drastically increased risk for theft that would result from leaving keys in the ignition. Interior lights also need to operate independently from the ignition switch. A vehicle operator would have difficulty in finding the ignition lock without the interior light at night. The interior light also provides some degree of security in that it allows a vehicle operator to inspect the passenger compartment of the vehicle prior to entering. The interior light also has many other usages in addition to the mere examples given here. Hazard or warning lights are another example of circuits that need to operate independently from the ignition switch. However, it is debatable whether these lights should be included with circuits that are disconnected by the present invention. In some instances it may be more desirable to maximize the time that the hazard lights remain functional than to maximize the life of the vehicle battery.

The operator can thus enjoy the present invention without changing any of his/her previous driving habits or procedures. When the vehicular battery is in good condition he/she experiences nothing unusual. The following steps illustrate the procedure involved in using a vehicle that is equipped with a battery safety switch:

1) The vehicular operator turns off the ignition and leaves his/her vehicle unattended with one or more battery loads inadvertently energized, the battery safety switch disconnects those loads when the battery voltage is reduced to a predetermined threshold level. The battery still is able to safely start the engine of the vehicle.

2) The operator returns to the vehicle and switches the ignition on. This re-energizes the same loads that were earlier turned off by the battery safety switch.

3) The operator turns the key further and starts the engine. The engine recharges the battery to its fully charged state.

It should be noted that the battery is protected from being depleted of charge to such an extent that permanent damage occurs.

Installation of the battery safety switch is easily performed with a bare minimum knowledge about electrical systems. This device only requires four connections. All connections can either be made to the fuse box itself, or to points in the immediate vicinity of the fuse box. No additional routing of wires is necessary, and only one of the existing wires need to be cut.

Redundancy provides additional ruggedness by making the function of the battery safety switch insensitive to component failure. The battery safety switch includes a current limiting device that provides the relay coil with a constant current. This renders a relay drive circuit that is substantially independent of the battery voltage itself. Turning on the ignition facilitates reset by providing a separate current path to the relay coil. The relay is capable of maintaining its relay contact in an energized state even though one of the current paths is broken. The relay is further capable of maintaining contact closure even though its solenoid voltage is decreased far below its rated value. This redundant safety system guarantees that the battery safety switch will always engage when it should. More importantly, it will never disengage any electrical load while the vehicle is driven.

The internal circuitry of the battery safety switch is powered by the relay itself. Hence, essentially no power is consumed from the battery when the relay is disengaged.

To attain these and other objectives an apparatus is provided for implementing one or more of the features set forth above.

BRIEF DESCRIPTION OF THE DRAWINGS

Other objects and advantages of the invention will become apparent upon reading the following detailed description and upon reference to the drawings in which.

Figure 1:
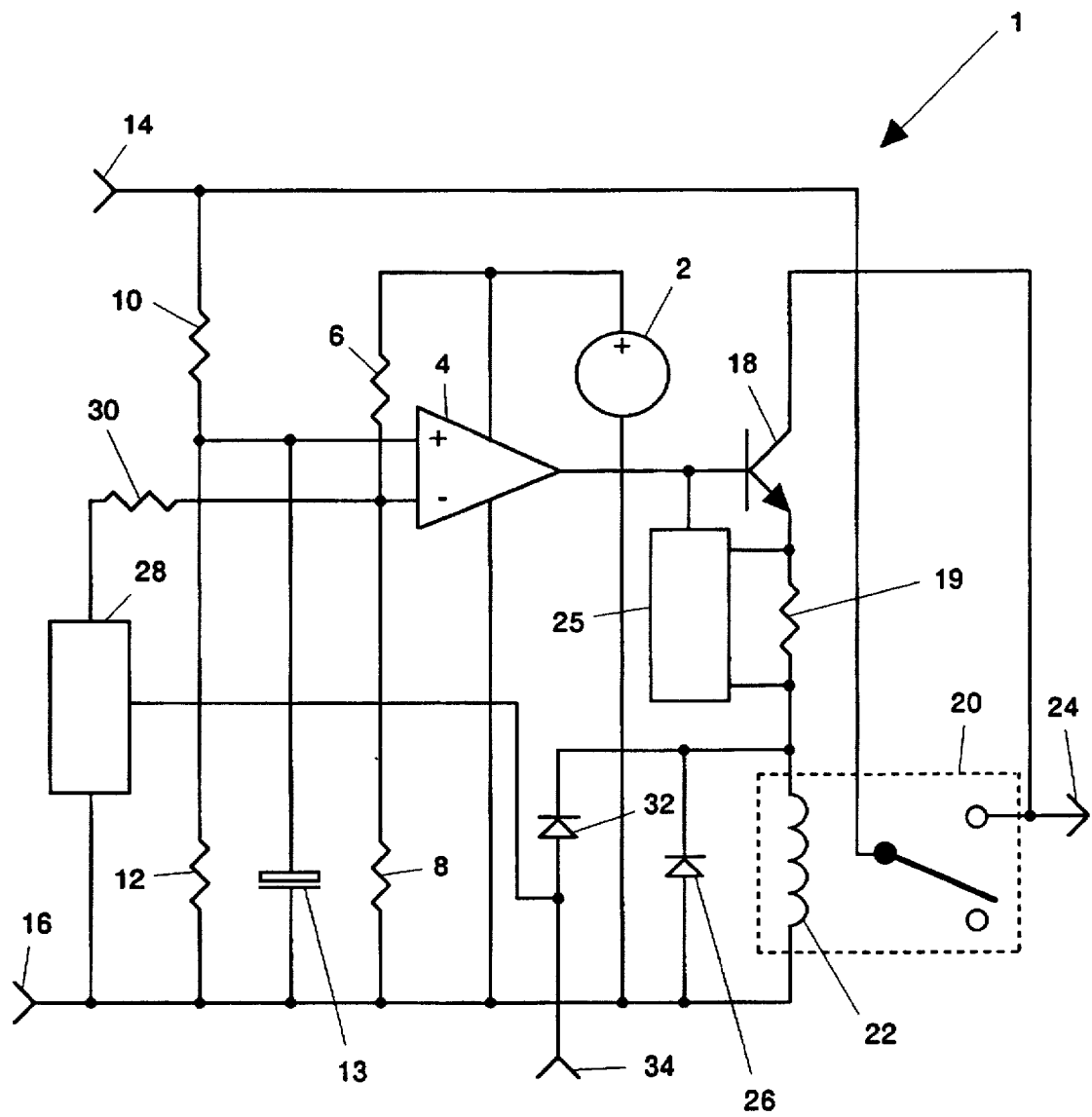
FIG. 1 shows a schematic drawing of the present invention.

While the invention is susceptible to various modifications and alternate forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF PREFERRED EMBODIMENTS

Turning now to FIG. 1, a schematic diagram of the present invention is shown. A battery safety switch, 1, comprises a voltage reference, 2, a comparator circuit, 4. The voltage reference, 2, defines a stable voltage that is substantially smaller than the battery voltage. The voltage reference, 2, provides the comparator, 4, with a stable supply voltage. A first resistor, 6, forms a first voltage divider with a second resistor, 8, and the voltage reference, 2. The first voltage divider determines a first threshold at which the comparator, 4, changes its output from a high voltage state to a low voltage state. The magnitude of the high voltage output state of the comparator, 4, is determined primarily by the voltage reference, 2. A second voltage divider is formed by a third resistor, 10, and a fourth resistor, 12. The second voltage divider defines a fractional voltage based on the battery voltage. A first capacitor, 13, is connected the the second voltage divider. The first capacitor, 13, forms a filter network with the second voltage divider, thereby reducing noise and other signal contaminants. The battery voltage is connected between a first terminal, 14, and a second terminal, 16. The first terminal, 14, connects to the positive battery pole, and the second terminal, 16, to the ground or negative battery pole. The fractional voltage from the second voltage divider forces the comparator, 4, to remain in its high voltage output state as long as the threshold voltage defined by the first voltage divider is lower. The comparator, 4, is buffered by a transistor switch, 18, connected as an emitter follower. The transistor switch, 18, controls the current flow through a shunt resistor, 19, and a solenoid, 22, in a relay, 20. The relay, 20, controls the current flow from the battery, not shown, to external loads, not shown. The relay, 20, completes a circuit between the first terminal, 14, and a third terminal, 24. The third terminal, 24, connects to external loads. The voltage across the relay solenoid, 22, is maintained by the transistor switch, 18. The shunt resistor, 19, is used to measure the solenoid current through the relay solenoid 22. A current limiting circuit, 25, measures the current through the shunt resistor, 19, and maintains a current less than or equal to a preset limit. The current limit is normally chosen low enough to engage the current limiting circuit, 25, during a substantial portion of the time the relay, 20, is engaged. Thus, the function of the solenoid is substantially independent of the battery voltage.

A first diode, 26, is connected in anti-parallel with the relay solenoid, 22. This first diode, 26, serves to protect the switching transistor, 18, from voltage spikes originating in the relay solenoid, 22, during turn-off. The relay solenoid, 22, is turned-off, or de-energized, by the comparator, 4, when the battery voltage decreases to a voltage that is substantially lower than the nominal battery voltage, but still sufficient to allow a vehicle to safely start. This voltage is normally in the 11 V range. Additionally, starter batteries (normally lead-acid batteries used, for example, in automobiles) have a tendency to recover when disconnected from one or more loads. The degree of recovery is proportional, or at least dependent, on the magnitude of the load. The heavier the load the more a battery recovers. The battery recovery is recognized by a slowly increasing battery voltage. As much a six hours may be required for a battery to fully complete its recovery after being disconnected from a heavy load. This type of recovery does not mean that the battery recharges itself, but only that its internal chemical processes reach equilibrium. Small electrical loads disturb the chemical equilibrium of a battery by only a small amount—hence, only a minimal recovery is to be expected.

A timer, 28, is reset and started every time the ignition of a vehicle equipped with the battery safety switch, 1, is turned off. The timer, 28, is normally preset for a time delay in the range of 4 to 12 hours. This is typically the time that is required for heavy electrical loads, such as headlights etc., to bring the battery voltage down to the approximately 11 V range where the relay, 20, turns off. At this point the battery starts to recover and eventually reaches a no-load voltage in the 12 V range. Recharging the battery to its nominal 13 V range is easily accommodated by the alternator in the vehicle that the battery is installed in.

The output of the timer, 28, is connected to a fifth resistor, 30, that is used to form a second threshold from the first threshold of the first voltage divider. The second threshold is formed when the timer, 28, reaches its preset delay time and raises its output from a low voltage level to a high voltage level (normally in the range of 0 to 12 V). This high voltage level of the output of the timer, 28, enables the fifth resistor, 30, to contribute a current to the first voltage divider, thereby raising the threshold level from the first level to the second level. The battery safety switch, 1, is now able to detect if low power accessories, including itself, provide a current drain that may reduce the charge level in the battery beyond a safe level. In this event, all loads that are connected to the battery via the battery safety switch, 1, are disconnected by the relay, 20. This reduces the chances of incurring permanent battery damage from excessive discharge. Lead-acid starter batteries begin to get damaged when the nominal no-load voltage is decreased below approximately 12.1 V. This second threshold voltage level is necessary due to the small battery recovery expected from loads.

The timer, 28, raises its output voltage only momentarily, to reduce the chances of forcing the relay, 20, to turn off in error. Raising the threshold level makes the circuitry of the battery safety switch, 1, become more sensitive to noise. For example, opening the car door may be enough to trigger the comparator, 4, to turn the relay, 20, off. Therefore, it is necessary to reduce the amount of time at which the threshold level is raised. Further, the timer, 28, is reset subsequent to momentarily raising the threshold level. This cycle is repeated every time the timer, 28, reaches its preset time delay. It is therefore, possible for the battery safety switch, 1, to remain in its low threshold voltage state most of the time. This state maximizes noise immunity. Every 4 to 12 hours, depending on the specific time delay chosen, the threshold level is raised to check if low power loads connected to the battery safety switch, 1, including itself, are draining the battery too much. If this is the case, or if a heavy load is still connected, the battery safety switch, 1, disconnects.

A second diode, 32, provides reset capability subsequently to turn-off. This reset capability is unconditional, i.e., the reset forces the relay, 20, to re-engage regardless of battery voltage. Thus, it is suitable to connect the second diode, 32, to the ignition switch of a vehicle that is equipped with the battery safety switch, 1. The ignition switch connection forces the battery safety switch, 1, to always be in an energized or engaged state while driving the vehicle. A fourth terminal, 34, facilitate this connection. The second diode, 32, isolates the solenoid, 22, from the ignition switch when the ignition switch is turned off.

The fact that the voltage reference, 2, provides a voltage substantially lower than the battery voltage is advantageous during abnormal operating conditions. For example, in cases where the battery voltage is extremely low, but where it is still essential that the ignition switch maintains the battery safety switch in its energized state.

The voltage reference, 2, becomes incapable of maintaining a regulated output voltage when the difference between the battery voltage and the rated regulator voltage becomes insignificant. This level may be between 0.5 V and 3 V depending on the particular voltage reference chosen. At this instance the voltage reference, 2, and the comparator, 4, may begin to function in an unpredictable manner. However, this potential unpredictability is immaterial since the second diode, 32, provides a separate current path to the relay solenoid, 22. The limiting factor here is thus the so called drop-out voltage of the relay, 20. This level is normally in the range from 2 V to 5 V for relays that are suitable for this type of applications. The voltage level where a relay becomes energized is the so called pull-in voltage, and is normally approximately 7 V in automotive systems. The above numbers are illustrative for a battery safety switch optimized for a 12 V system. It is hence, apparent that only 8 V are required in a 12 V system to guarantee engagement of the battery safety switch, 1. Further, the battery safety switch, 1, will remain energized even though the battery voltage decreases to levels approaching 5 V. It is thus clear that the battery safety switch, 1, is capable of functioning properly far beyond most of the remaining electrical system in a vehicle.

Figure 2:
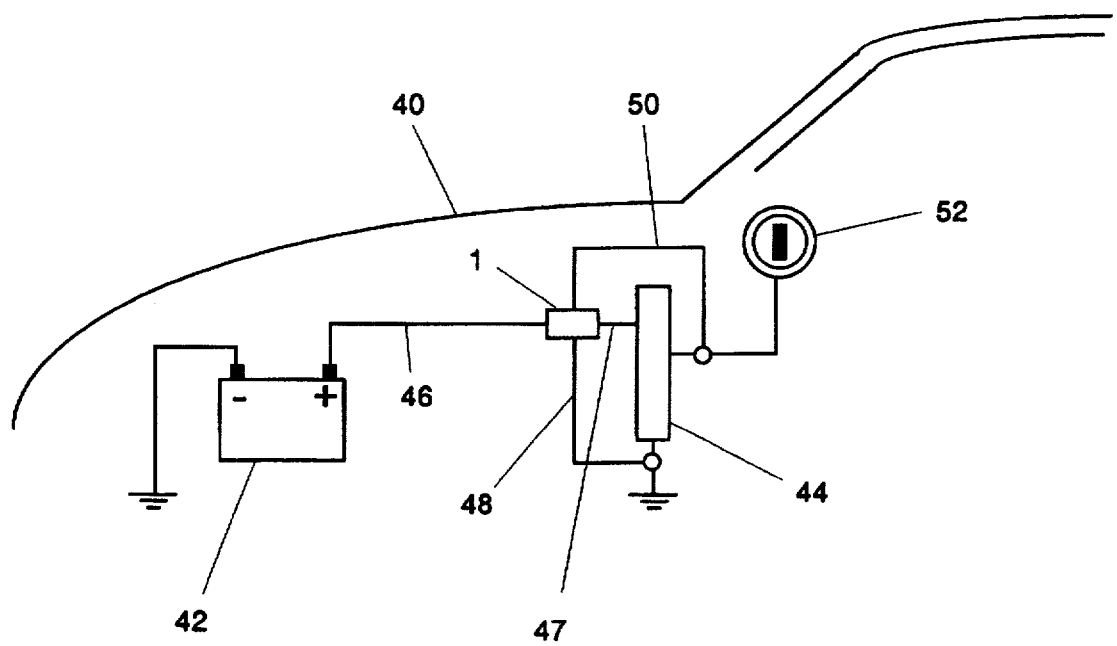
FIG. 2 illustrates a preferred method and location for installation of the present invention.

FIG. 2 illustrates a preferred location and installation procedure of the battery safety switch, 1, in a vehicle, 40. The battery safety switch, 1, connects in series with the battery, 42, and a fuse box, 44, normally located under the dashboard inside the passenger compartment of the vehicle, 40. The battery safety switch, 1, does not include the starter motor in any of its circuits.

The preferred location for installation of the battery safety switch, 1, is as close to the fuse box, 44, as possible. Normally an incoming power cord, 46, leading to the fuse box, 44, is cut just before entering the fuse box, 44, itself. The two power terminals of the battery safety switch, 1, are connected in series with the cut incoming power cord, 46. The part of the old power cord, 46, that now connects the battery safety switch, 1, to the fuse box, 44, becomes a load connection, 47, to the battery safety switch, 1. This load connection, 47, attaches to one or more fuses in the fuse box. The fuses of interest are those that connect to circuits such as head lights, parking light, interior lights, or the cigarette lighter. These are the typical circuits that an operator of a vehicle inadvertently leaves on, subsequently to turning the ignition off and leaving the vehicle.

A ground terminal, 48, of the battery safety switch, 1, is connected to chassis ground, i.e. any exposed metal surface or part of the dash board structure. The last connection of the battery safety switch is the ignition switch connection, 50. Since many accessories, such as radios etc., are operated from the ignition switch, 52, there are at least one fuse in the fuse box, 44, that is activated by the ignition switch, 52. This fuse provides a suitable location for the ignition switch connection, 50. Hence, all connections necessary for proper operation of the battery safety switch, 1, can be located in the immediate vicinity of the fuse box, 44, in a vehicle, 40.

Several late model vehicles make such an extensive use of power accessories that an additional fuse box is deemed necessary. This fuse box is normally located under the hood of the vehicle, and not inside the passenger compartment. The original fuse box is usually still located inside the passenger compartment in its regular location under the dashboard. The additional, or second, fuse box is normally in command of accessories requiring large amounts of power, such as electric windshields etc.. These accessories are normally engaged by relays or other circuits that are wired into the ignition key, and need no additional protection from a potential user neglect that could lead to a discharged battery. The addition of the second fuse box does not significantly change those circuits protected by the original, or internal, fuse box. Hence, the function or installation of the battery safety switch should not change significantly, if at all, with the addition of a second external fuse box in a vehicle.

Figure 3:
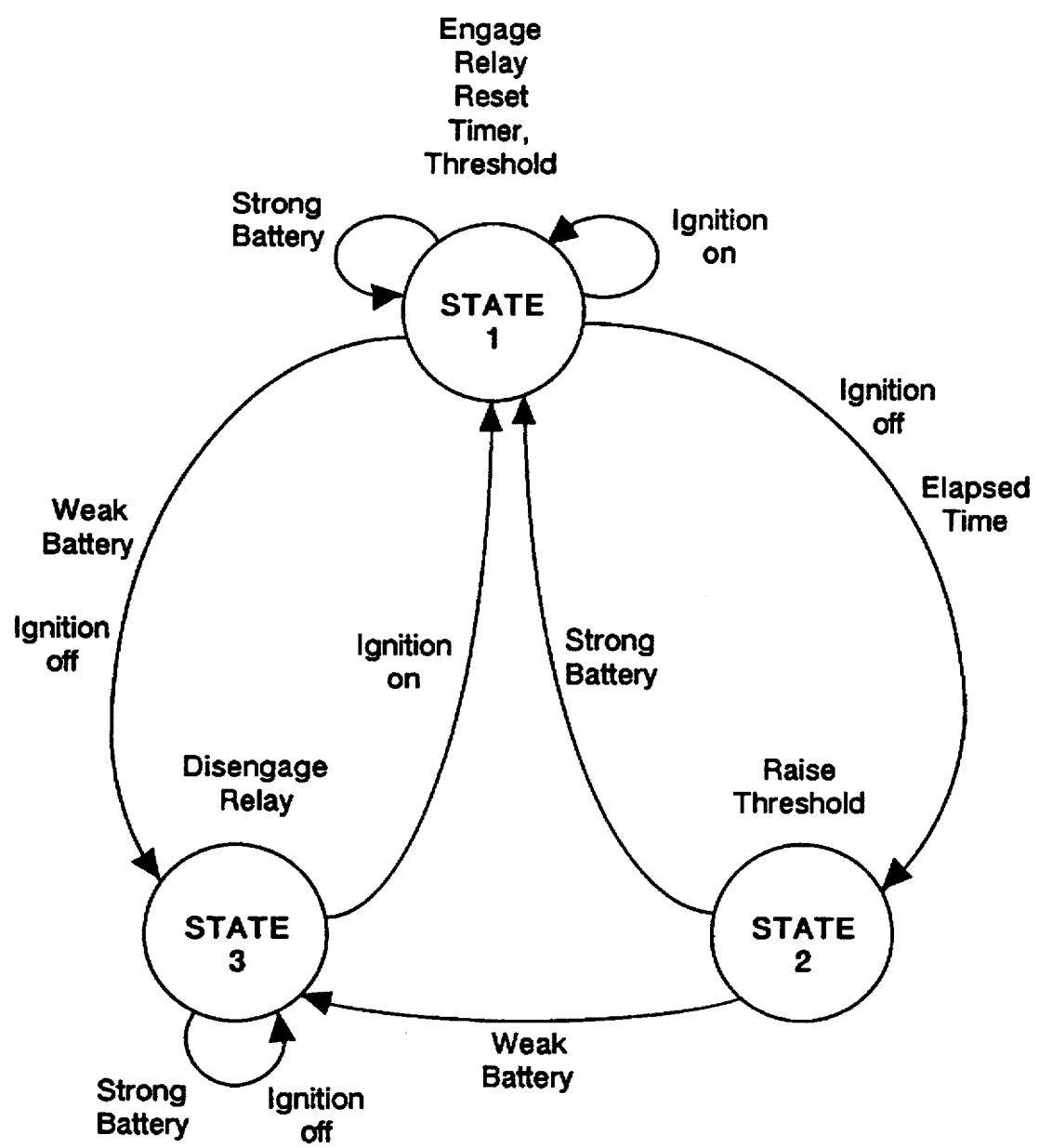
FIG. 3 shows a flow graph representation of a preferred process implementation of the present invention.

FIG. 3 illustrates a so called signal flow graph of the process implemented by the battery safety switch. This process is described by using three separate states. The first state illustrates those conditions that either maintain the battery safety switch in an engaged mode, or changes it into an engaged mode. The second state shows how the threshold level is raised each time the timer reaches its time delay. The third state is similar to the first, but illustrates a disengaged mode of the battery safety switch.

In its engaged mode, the battery safety switch allows a current to flow to its loads from a connected battery, i.e. a select few circuits in a vehicle with insufficient protection. Such circuits include interior lights, parking lights, head lights, and the cigarette lighter adapter of the vehicle. In short, all circuits that are possible to forget to turn off when switching the ignition off and leaving the vehicle unattended. Likewise, in its disengaged mode the battery safety switch does not permit a current flow to these same loads.

The battery safety switch will appear in its first state when powered-up. In this state, vehicles equipped with this device function identically to those vehicle that ar not equipped with this device. No current flows are restricted since the relay inside the battery safety switch is energized. The battery safety switch maintains this state as long as the battery voltage is greater than the current threshold. This threshold is normally set to approximately 11 V in 12 V systems, which allows a vehicle to be safely started. The threshold is, however, raised above 11 V each time the timer reaches its preset time delay. In addition, the battery safety switch is maintained in the first state as long as the ignition is turned on. The ignition switch is used as a reset means, and a safety precaution. The safety comes in that the battery safety switch will never de-energize its relay when a vehicle is being driven. Hence, lights or accessories powered by the battery safety switch can never be affected by temporary voltage sags or other problems in the electrical system of the vehicle while the vehicle is driven.

The second state is entered each time the timer reaches its preset time delay, normally between 4 and 12 hours. The threshold is momentarily raised. If the battery voltage is above this threshold, the first state is re-entered. Otherwise, the third state is entered.

The third state illustrates a condition in which the battery safety switch de-energizes its internal relay. This occurs when two conditions exist simultaneously: The battery voltage of a vehicle equipped with this device decreases below a predetermined threshold and the ignition is switched off. This threshold is, as mentioned above, approximately 11 V in a 12 V system. An exception to this occurs when the second state has previously been entered. In this case, the threshold value is increased to approximately 12 V. The battery safety switch maintains its internal relay in a de-energized state until the ignition switch is turned on. This third state is maintained even if the battery recovers slightly and increases its voltage above the threshold value. Thus, the battery safety switch will never cycle between two states. Any battery recovery subsequently to entering the third state is saved for starting the vehicle, thereby reducing the level of stress on the battery.

What is claimed is:

1. An automatic battery safety switch comprising:

A voltage reference having a reference voltage, a battery having a voltage, a comparator, a timer, said voltage reference being coupled to said comparator wherein a voltage threshold is established, said comparator being further coupled to a voltage divider that provides a fraction of said battery voltage, said comparator being responsive to a difference between said fraction of said battery voltage and said voltage threshold by means of generating a first state of a first signal, said first state of said first signal being coupled to a switching means in the event that said fraction of said battery voltage is greater than said voltage threshold, said switching means responding to said first state of said first signal by providing an electrical connection between said battery and at least one load;

said switching means responding to a second state of said first signal by terminating said electrical connection between said battery and said at least one load when said fraction of said battery voltage is less than said voltage threshold, said second state of said first signal being indicative of a depleted battery;

Said timer intermittently raising said voltage threshold, said raised voltage threshold causing termination of said electrical connection between said battery and said at least one load in the event at least one small load is excessively draining said battery, said at least one small load comprising the automatic battery safety switch.

* * * * *